United States Patent [19]
Edwards et al.

[11] Patent Number: 5,890,804
[45] Date of Patent: Apr. 6, 1999

[54] AUTOMATIC STIRRING AND SCRAPING DEVICE

[76] Inventors: Vicki K. Edwards; William D. Edwards, both of 613 High St., West Fairview, Pa. 17025

[21] Appl. No.: 988,836

[22] Filed: Dec. 11, 1997

[51] Int. Cl.⁶ ....................................................... B01F 7/16
[52] U.S. Cl. ............................ 366/249; 366/309; 99/348
[58] Field of Search ...................................... 366/249, 247, 366/251, 252, 309, 242, 244, 245, 248; 99/348; 219/429, 438

[56] References Cited

U.S. PATENT DOCUMENTS

| | | | |
|---|---|---|---|
| 2,603,740 | 7/1952 | Buttero | 219/429 |
| 3,505,498 | 4/1970 | Shevlin | 219/438 |
| 3,513,296 | 5/1970 | Brangs et al. | 219/429 |
| 4,151,792 | 5/1979 | Nearhood | 366/251 |
| 4,173,925 | 11/1979 | Leon | 99/348 |
| 4,395,133 | 7/1983 | Clevenholm et al. | 366/348 |
| 4,854,718 | 8/1989 | Wang | 366/252 |
| 4,856,910 | 8/1989 | Cuschera | 366/251 |
| 5,193,524 | 3/1993 | Loyd et al. | 126/389 |
| 5,261,745 | 11/1993 | Watkins | 366/251 |
| 5,497,695 | 3/1996 | Canela | 366/252 |
| 5,547,279 | 8/1996 | Spitzer, Sr. | 366/251 |
| 5,711,602 | 1/1998 | Rohring et al. | 366/251 |

*Primary Examiner*—Tony G. Soohoo

[57] ABSTRACT

A stir pot is provided including a stirring unit having an outer stir portion with an outer edge. Such outer edge defines a size and shape corresponding to a vertical cross-section of an interior surface of the pot along a diameter thereof. As such, the stirring unit is rotatably situated within the pot and adapted to rotate about central axis of the pot and the outer edge is adapted to scrape the interior surface of pot when rotating. Further provided is a rotating mechanism for selectively rotating the stirring unit.

20 Claims, 2 Drawing Sheets

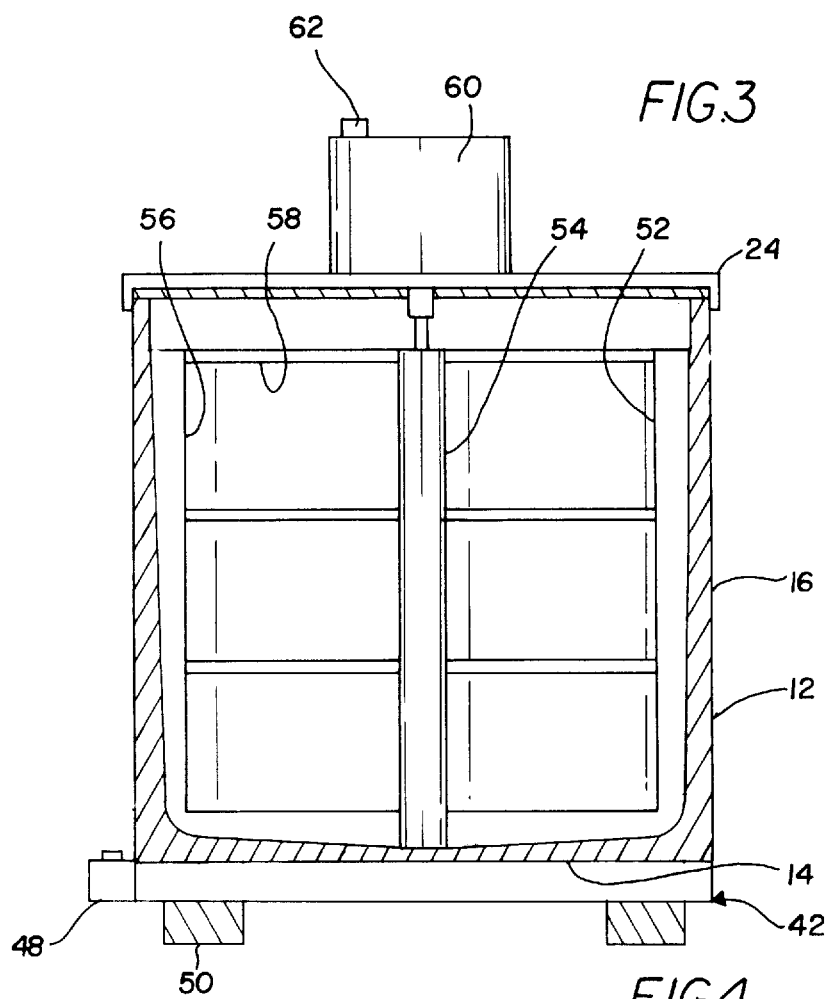
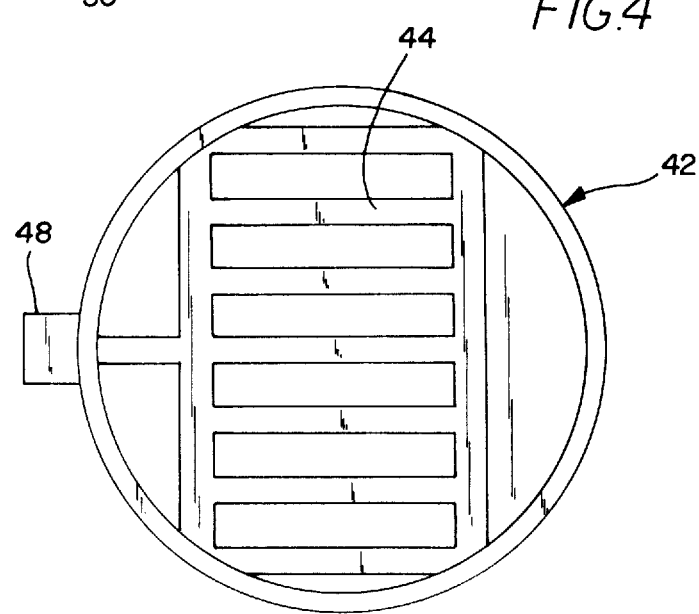

AUTOMATIC STIRRING AND SCRAPING DEVICE

BACKGROUND OF THE INVENTION

1. Field of the Invention

The present invention relates to pot stirring systems and more particularly pertains to a new automatic stirring and scraping device for stirring food within a pot and preventing the same from being burned.

2. Description of the Prior Art

The use of pot stirring systems is known in the prior art. More specifically, pot stirring systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art pot stirring systems include U.S. Pat. No. 5,372,422; U.S. Pat. No. 5,013,158; U.S. Pat. No. 5,193,441; U.S. Pat. No. 4,952,069; U.S. Pat. No. 4,856,910; and U.S. Pat. Des. No. 300,799.

In these respects, the automatic stirring and scraping device according to the present invention substantially departs from the conventional concepts and designs of the prior art, and in so doing provides an apparatus primarily developed for the purpose of stirring food within a pot and preventing the same from being burned.

SUMMARY OF THE INVENTION

In view of the foregoing disadvantages inherent in the known types of pot stirring systems now present in the prior art, the present invention provides a new automatic stirring and scraping device construction wherein the same can be utilized for stirring food within a pot and preventing the same from being burned.

The general purpose of the present invention, which will be described subsequently in greater detail, is to provide a new automatic stirring and scraping device apparatus and method which has many of the advantages of the pot stirring systems mentioned heretofore and many novel features that result in a new automatic stirring and scraping device which is not anticipated, rendered obvious, suggested, or even implied by any of the prior art pot stirring systems, either alone or in any combination thereof.

To attain this, the present invention generally comprises a pot constructed from a heat conductive metal. As shown in FIGS. 2 & 3, the pot has a circular bottom face and a cylindrical side wall integrally coupled to a periphery of the bottom face and extending upwardly therefrom. As such, an interior space and an open top with an upper peripheral edge are defined. The pot further includes a pair of primary loops hingably coupled on diametrically opposed sides of the side wall adjacent to the upper peripheral edge. Associated therewith is a secondary loop hingable coupled to the side wall adjacent to the upper peripheral edge. The secondary loop is offset from the primary loops by about 90 degrees. Further provided is a pair of closed loop handles each having a generally U-shaped configuration, The handles are integrally coupled to diametrically opposed sides of the side wall adjacent to the upper peripheral edge and below the primary loops. FIGS. 1 & 2 show a pair of lids including a closed lid and a meshed lid. Each of the lids have a disk-shaped plate with a top face, a bottom face and a periphery. It should be noted that the plate of the closed lid is impermeable and the plate of the meshed lid is formed of a wire mesh for allowing the passage of fluid. The plate of each lid has a fixed portion and a movable portion hingably coupled to the fixed portion along a chord of a circle defined by the plate. A pair of primary protrusions extend radially from diametrically opposed sides of the periphery of the plate. A secondary protrusion extends radially from the periphery of the plate and offset from the primary protrusions about 90 degrees. Further, a mounting strip is provided having a thin planar rectangular configuration with a pair of ends coupled to the top face of the plate between the primary protrusions. A central aperture is formed in the mounting strip which is in coaxial alignment with a central aperture formed in the plate. In use, one of the lids is removably mounted over the open top of the pot with the loops thereof being removably secured to the corresponding protrusions for preventing the removal of the lid. As shown in FIG. 3, a heating assembly is mounted to a lower surface of the bottom face of the pot. The heating assembly has a hollow disk-shaped configuration and a plurality of linear heating rods mounted therein for producing heat upon the receipt of power. As shown in FIG. 4, the rods each are situated in a spaced parallel relationship for evenly distributing the aforementioned heat. The heating assembly further includes a thermostat positioned on a periphery of the heating assembly and connected between a power source and the heating rods for selectively supplying power thereto. Mounted to a lower surface of the heating assembly is a plurality of insulative pads which extend downwardly therefrom for elevating the pot and heating assembly from a recipient surface. FIG. 3 shows a stirring unit including a cylindrical central portion and a generally U-shaped outer stir portion. The outer stir portion is equipped with a pair of vertical side extents, a horizontal bottom extent, and an outer edge. The outer edge defines a size and shape corresponding to a vertical cross-section of an interior surface of the pot along a diameter thereof. The bottom extent of the outer stir portion is coupled to a lower end of the central portion. Further, a plurality of inner stir portions extend radially between the central portion and the respective vertical extent of the outer stir portion. By this structure, the stirring unit is rotatably situated within the pot and adapted to rotate about central axis of the pot. Finally, a rotating mechanism includes motor removably mounted to a top central extent of the mounting strip of one of the lids. The rotor of the motor extends through the central apertures of the mounting strip and the corresponding lid. Such rotor is further coupled with a top end of the central portion of the stirring unit for rotating the same upon the receipt of power.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automatic stirring and scraping device apparatus and method which has many of the advantages of the pot stirring systems mentioned heretofore and many novel features that result in a new automatic stirring and scraping device which is not anticipated, rendered obvious, suggested, or even implied by any of the prior art pot stirring systems, either alone or in any combination thereof.

It is another object of the present invention to provide a new automatic stirring and scraping device which may be easily and efficiently manufactured and marketed.

It is a further object of the present invention to provide a new automatic stirring and scraping device which is of a durable and reliable construction.

An even further object of the present invention is to provide a new automatic stirring and scraping device which is susceptible of a low cost of manufacture with regard to both materials and labor, and which accordingly is then susceptible of low prices of sale to the consuming public, thereby making such automatic stirring and scraping device economically available to the buying public.

Still yet another object of the present invention is to provide a new automatic stirring and scraping device which provides in the apparatuses and methods of the prior art some of the advantages thereof, while simultaneously overcoming some of the disadvantages normally associated therewith.

Still another object of the present invention is to provide a new automatic stirring and scraping device for stirring food within a pot and preventing the same from being burned.

Even still another object of the present invention is to provide a new automatic stirring and scraping device that includes a stirring unit having an outer stir portion with an outer edge. Such outer edge defines a size and shape corresponding to a vertical cross-section of an interior surface of the pot along a diameter thereof. As such, the stirring unit is rotatably situated within the pot and adapted to rotate about central axis of the pot and the outer edge is adapted to scrape the interior surface of pot when rotating. Further provided is a rotating mechanism for selectively rotating the stirring unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention.

FIG. 4 is an interior view of the heating assembly of the present invention.

DESCRIPTION OF THE PREFERRED EMBODIMENT

Figure 1:
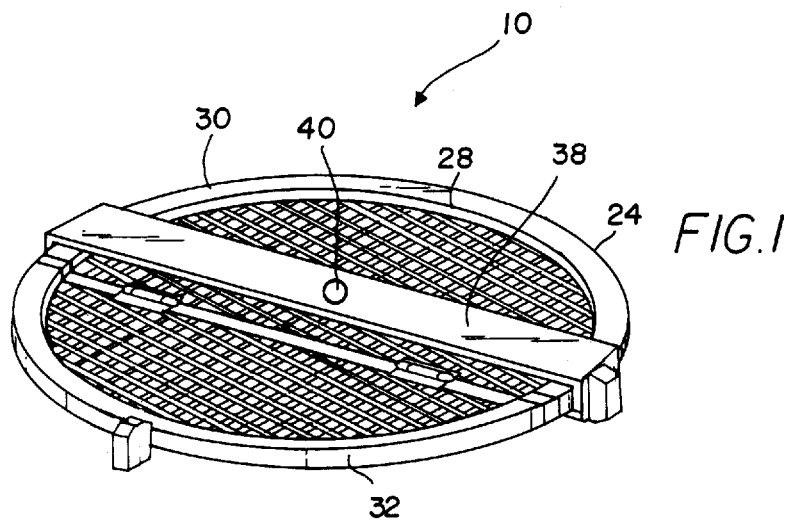
FIG. 1 is a perspective view of one of the lids of the present invention.

With reference now to the drawings, and in particular to FIGS. 1 through 4 thereof, a new automatic stirring and scraping device embodying the principles and concepts of the present invention and generally designated by the reference numeral 10 will be described.

Figure 2:
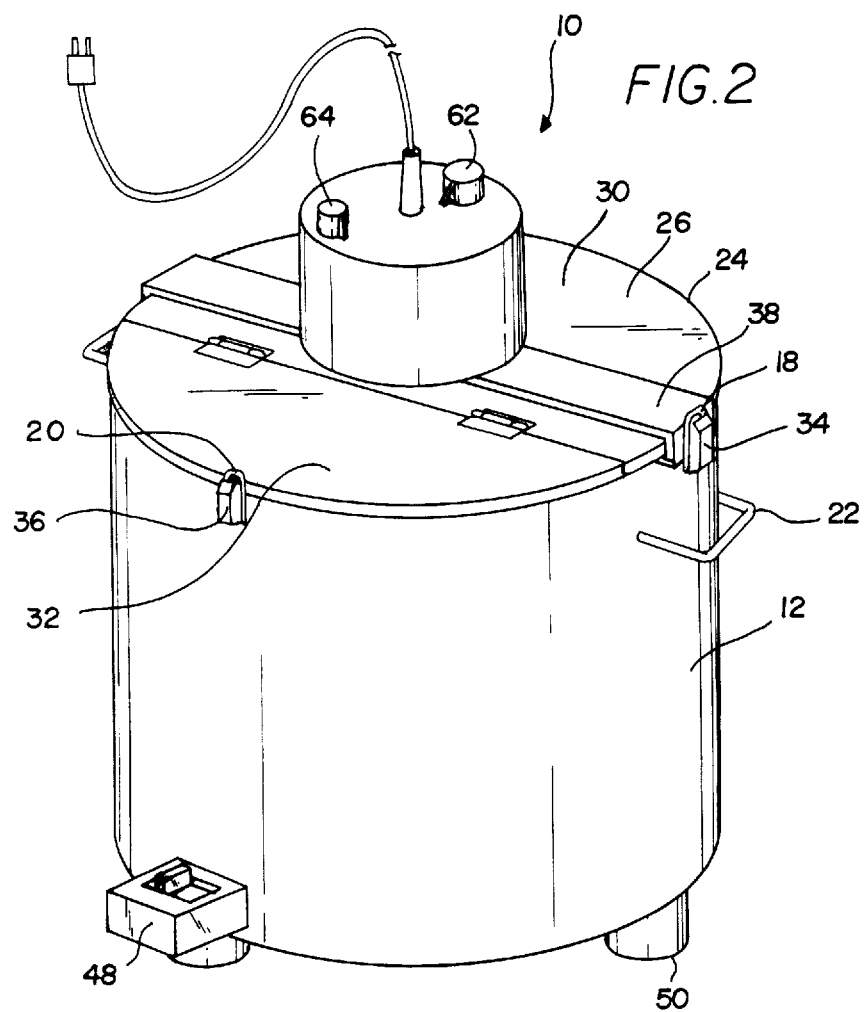
FIG. 2 is a perspective view of the present invention.

The present invention, designated as numeral 10, includes a pot 12 constructed from a heat conductive metal. As shown in FIGS. 2 & 3, the pot has a circular bottom face 14 and a cylindrical side wall 16 integrally coupled to a periphery of the bottom face and extending upwardly therefrom. As such, an interior space and an open top with an upper peripheral edge are defined.

The pot further includes a pair of primary loops 18 hingably coupled on diametrically opposed sides of the side wall adjacent to the upper peripheral edge. Associated therewith is a secondary loop 20 hingable coupled to the side wall adjacent to the upper peripheral edge. The secondary loop is offset from the primary loops by about 90 degrees.

Further provided is a pair of closed loop handles 22 each having a generally U-shaped configuration. The handles are integrally coupled to diametrically opposed sides of the side wall adjacent to the upper peripheral edge and below the primary loops.

FIGS. 1 & 2 show a pair of lids 24 including a closed lid 26 and a meshed lid 28. The meshed lid preferably has a frame for maintaining the shape thereof. Each of the lids have a disk-shaped plate with a top face, a bottom face and a periphery. It should be noted that the plate of the closed lid is impermeable and the plate of the meshed lid is formed of a wire mesh.

The plate of each lid has a fixed portion 30 and a movable portion 32 hingably coupled to the fixed portion along a chord of a circle defined by the plate. A pair of primary protrusions 34 extend radially from diametrically opposed sides of the periphery of the plate. A secondary protrusion 36 extends radially from the periphery of the plate and is offset from the primary protrusions about 90 degrees. Further, a mounting strip 38 is provided having a thin planar rectangular configuration with a pair of ends coupled to the top face of the plate between the primary protrusions. A width of the mounting strip is preferably less than ¼ the diameter of the lid. A central aperture 40 is formed in the mounting strip which is in coaxial alignment with a central aperture formed in the plate. In use, one of the lids is removably mounted over the open top of the pot with the loops thereof being removably secured to the corresponding protrusions for preventing the removal of the lid.

As shown in FIG. 3, a heating assembly 42 is mounted to a lower surface of the bottom face of the pot. The heating assembly has a hollow disk-shaped configuration and a plurality of linear heating rods 44 mounted therein for producing heat upon the receipt of power. As shown in FIG. 4, the rods each are situated in a spaced parallel relationship for evenly distributing the aforementioned heat. The heating assembly further includes a thermostat 48 positioned on a periphery of the heating assembly and connected between a power source and the heating rods for selectively supplying power thereto. Mounted to a lower surface of the heating assembly is a plurality of insulative pads 50 which extend downwardly therefrom for elevating the pot and heating assembly from a recipient surface. As an option, the heating assembly may be excluded for allowing use of the present invention on a conventional stove top.

FIG. 3 shows a stirring unit 52 including a cylindrical central portion 54 and a generally U-shaped outer stir portion 56. The outer stir portion is equipped with a pair of vertical side extents, a horizontal bottom extent, and an outer edge. The outer edge defines a size and shape corresponding to a vertical cross-section of an interior surface of the pot along a diameter thereof. In the preferred embodiment, the outer edge of the outer stir portion is beveled and forms a 30 degree angle with respect to the vertical. The bottom extent of the outer stir portion is coupled to a lower end of the central portion. Further, a plurality of inner stir portions 58 extend radially between the central portion and the respective vertical extent of the outer stir portion. The width and thickness of both the inner and outer stir portions preferably do not exceed a couple inches. By this structure, the stirring unit is rotatably situated within the pot and adapted to rotate about central axis of the pot. As an option, the stirring unit may be layered with a TEFLON coating to facilitate the scraping of the interior surfaces of the side wall and bottom wall of the present invention.

Finally, a rotating mechanism 60 includes motor removably mounted to a top central extent of the mounting strip of one of the lids. This may be accomplished via any conventional clamping mechanism. The rotor of the motor extends through the central apertures of the mounting strip and the corresponding lid. Such rotor is further coupled with a top end of the central portion of the stirring unit for rotating the same upon the receipt of power. In the preferred embodiment, the rotating mechanism has an actuator dial 62 and a speed dial 64 associated therewith.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. An automatic stir pot comprising, in combination:

a pot constructed from a heat conductive metal and having a circular bottom face and a cylindrical side wall integrally coupled to a periphery of the bottom face and extending upwardly therefrom for defining an interior space and an open top with an upper peripheral edge, the pot further including a pair of primary loops hingably coupled on diametrically opposed sides of the side wall adjacent to the upper peripheral edge and a secondary loop hingable coupled to the side wall adjacent to the upper peripheral edge about 90 degrees offset from the primary loops;

a pair of closed loop handles each having a generally U-shaped configuration integrally coupled to diametrically opposed sides of the side wall adjacent to the upper peripheral edge and below the primary loops;

a pair of lids including a closed lid and a meshed lid each having a disk-shaped plate with a top face, a bottom face and a periphery, wherein the plate of the closed lid is impermeable and the plate of the meshed lid is formed of a wire mesh for allowing the passage of fluid, the plate of each lid having a fixed portion and a movable portion hingably coupled to the fixed portion along a chord of a circle defined by the plate, a pair of primary protrusions extending radially from diametrically opposed sides of the periphery of the plate, a secondary protrusion extending radially from the periphery of the plate and offset from the primary protrusions about 90 degrees, and a mounting strip having a thin planar rectangular configuration with a pair of ends coupled to the top face of the plate between the primary protrusions with a central aperture formed therein which is in coaxial alignment with a central aperture formed in the plate, whereby one of the lids is removably mounted over the open top of the pot with the loops thereof being removably secured to the corresponding protrusions for preventing the removal of the lid;

a heating assembly mounted to a lower surface of the bottom face of the pot, the heating assembly having a hollow disk-shaped configuration and a plurality of linear heating rods mounted therein for producing heat upon the receipt of power with the rods each being situated in a spaced parallel relationship, the heating assembly further including a thermostat connected to a periphery of the heating assembly and connected between a power source and the heating rods for selectively supplying power thereto;

a plurality of insulative pads mounted to a lower surface of the heating assembly and extending downwardly therefrom for elevating the pot and heating assembly from a recipient surface;

a stirring unit including a cylindrical central portion, a generally U-shaped outer stir portion with a pair of vertical side extents, a horizontal bottom extent, and an outer edge defining a size and shape corresponding to a vertical cross-section of an interior surface of the pot along a diameter thereof with the bottom extent of the outer stir portion being coupled to a lower end of the central portion, and a plurality of inner stir portions extending radially between the central portion and the respective vertical extent of the outer stir portion, whereby the stirring unit is rotatably situated within the pot and adapted to rotate about central axis of the pot; and a rotating mechanism including motor removably mounted to a top central extent of the mounting strip of one of the lids with the rotor thereof extending through the central apertures of the mounting strip and the corresponding lid and coupled with a top end of the central portion of the stirring unit for rotating the same upon the receipt of power.

2. A stir pot comprising:

a pot;

a stirring unit coated with an anti-stick layer and including an outer stir portion with an outer edge defining a size and shape corresponding to a vertical cross-section of an interior surface of the pot along a diameter thereof, whereby the stirring unit is rotatably situated within the pot and adapted to rotate about central axis of the pot and the outer edge is adapted to scrape the interior surface of pot when rotating; and a rotating mechanism for selectively rotating the stirring unit, wherein an inner surface of the pot and the outer edge of the stirring unit taper inwardly along an entire height thereof at an angle from a top thereof to a bottom thereof for facilitating the flow of food downwardly.

3. A stir pot as set forth in claim 2 wherein the rotating mechanism includes a motor.

4. A stir pot as set forth in claim 3 wherein a lid is removably situated on the pot and the motor is mounted to the lid.

5. A stir pot as set forth in claim 4 wherein a pair of lids are included and the motor is removably mounted to the lid.

6. A stir pot as set forth in claim 2 wherein a lid is removably situated on the pot.

7. A stir pot as set forth in claim 6 wherein the lid includes a movable portion and a fixed portion with the movable portion hingably coupled to the fixed portion along a chord of a circle defined by the plate.

8. A stir pot as set forth in claim 6 wherein a pair of lids are providing including a meshed lid and a closed lid.

9. A stir pot as set forth in claim 2 wherein a pair of closed loop handles are coupled to diametrically opposed sides of the pot.

10. A stir pot as set forth in claim 2 and further including a heating assembly mounted to a lower surface of a bottom face of the pot.

11. A stir pot as set forth in claim 10 wherein the heating assembly includes a plurality of linear heating rods each being situated in spaced parallel relationship.

12. A stir pot as set forth in claim 2 wherein the stirring unit has a U-shaped configuration.

13. A stir pot as set forth in claim 2 wherein the angle is 30 degrees.

14. A stir pot comprising:

a pot;

a stirring unit including an outer stir portion with an outer edge defining a size and shape corresponding to a vertical cross-section of an interior surface of the pot along a diameter thereof, whereby the stirring unit is rotatably situated within the pot and adapted to rotate about central axis of the pot and the outer edge is adapted to scrape the interior surface of pot when rotating;

a rotating mechanism for selectively rotating the stirring unit; and a pair of lids each removably situated on the pot with the rotating mechanism removably mounted thereon, the lids including a closed lid and a meshed lid, wherein the meshed lid has a mounting strip with a pair of ends coupled to a top face of the meshed lid between diametrically opposed portions thereof with a central aperture formed therein for receiving the rotating mechanism.

15. A stir pot as set forth in claim 14 wherein the rotating mechanism includes a motor.

16. A stir pot as set forth in claim 14 wherein each lid includes a movable portion and a fixed portion with the movable portion hingably coupled to the fixed portion.

17. A stir pot as set forth in claim 14 wherein a pair of closed loop handles are coupled to diametrically opposed sides of the pot.

18. A stir pot as set forth in claim 14 and further including a heating assembly mounted to a lower surface of a bottom face of the pot.

19. A stir pot as set forth in claim 18 wherein the heating assembly includes a plurality of linear heating rods each being situated in spaced parallel relationship.

20. A stir pot as set forth in claim 14 wherein the stirring unit has a U-shaped configuration.

* * * * *

UNITED STATES PATENT AND TRADEMARK OFFICE
CERTIFICATE OF CORRECTION

PATENT NO. : 5,890,804
DATED : April 6, 1999
INVENTOR(S) : Vicki K. Edwards

It is certified that error appears in the above-identified patent and that said Letters Patent is hereby corrected as shown below:

Title page, item [76], inventors: William D. Edwards should be deleted as an inventor.

Signed and Sealed this

Eighth Day of February, 2000

*Attest:*

Q. TODD DICKINSON

*Attesting Officer*     *Commissioner of Patents and Trademarks*